United States Patent Office 3,293,336
Patented Dec. 20, 1966

3,293,336
PROCESS FOR IMPROVING PARTICLEBOARD
Max Himmelheber, Saarstr. 7, Baiersbronn, Germany
No Drawing. Filed Jan. 21, 1963, Ser. No. 252,556
Claims priority, application Germany, Jan. 27, 1962,
H 44,724
3 Claims. (Cl. 264—37)

This invention relates to processes for the production of particleboard panels, and particularly to such a process wherein wood flour or, in some cases, sander dust, is added to the particles as a carrier material for additives such as oils, fats, waxes, dyes and catalysts.

It is customary to add to the glue-impregnated particle mix used for the production of wood particleboard, i.e., after the glue is applied, non-glue-impregated wood flour which has been screened from the particle mix prior to adding the glue. However, this has a deleterious effect upon the quality of the particleboard produced, particularly as regards resistance to moisture effects.

The invention emanates from the experience that, if in the process of producing particleboard panels, sander dust generated by the operation of finishing the particleboard is added to the particle mix, the properties of the panels are improved even though no other additives are added to this sander dust which is meant to be used as a carrier of the additives. The sander dust generated by finishing the particleboard as such contains water-repelling agents and cured synthetic resin; besides the wood substances which can swell (hemi-cellulose) to some extent are irreversibly hardened. The invention is characterized by the fact that sander dust generated by sanding finished particleboard panels and containing no additives is added to the particle mix used in the production of the particleboard before or after glue impregnation. A special and surprising effect noted in so doing was the fact that adding the sander dust after glue impregnation serves to improve the moisture resistance of the finished panels even more so that adding it prior to glue impregnation. In any case, the sander dust generated by finishing the particleboard acts both as a moisture-repelling agent and to condense the particleboard structure, especially to enhance the solidity of the panel surface.

The immediate surprising effect, namely that adding non-glue-impregnated sander dust makes for more moisture-proof panels than adding glue-impregnated sander dust—in which connection equal amounts of binder are applied to the total volume of wood substance, including the dust—is probably due to the fact that the points having the least moisture resistance in the overall structure of the panels govern the degree of swell and moisture absorption, points which certainly reside in the fresh particles and not in dust generated by finishing the cured particleboard panels. However, these particles are more heavily glue-impregnated, if no glue is withdrawn for impregnating the added sander dust.

The process of the invention distinguishes itself advantageously from a process already known wherein the outer layers of particleboard panels are formed exclusively of sander dust which is additionally impregnated with fresh glue. Although such pure sawdust surfaces are very firm and solid, they possess little tensile strength. However, the tensile strength of the outermost layers governs the bending strength of the particleboard panels (sandwich effect). Blending dust and particles results in a tenacious and solid structure.

Having thus described my invention what I consider new and desire to have protected by Letters Patent is pointed out in the appended claims.

I claim:
1. The process for manufacturing particleboard panels by forming the panels from a particle mixture, which comprises providing the particle mixture with an addition of dust resulting from sanding other previously formed panels.
2. The process for manufacturing particleboard panels by forming the panels from a particle mixture, which comprises adding dust resulting from sanding other previously formed panels to the particle mixture, impregnating the dust and particle mixture with a binder and curing the binder-impregnated dust and particle mixture.
3. The process for manufacturing particleboard panels by forming the panels from a particle mixture, which comprises impregnating the particle mixture with a binder, and adding dust resulting from sanding other previously formed panels to the binder-impregnated particle mixture prior to curing the same.

References Cited by the Examiner
UNITED STATES PATENTS 2,635,301   4/1953   Schubert et al. ___ 156—375 XR
2,743,758   5/1956   Uschmann _____ 156—35 XR
2,989,774   6/1961   Erickson et al. ____ 264—37 X

OTHER REFERENCES

"Fiberboard and Particle Board," a report of an International Consultation on Insulation Board, Hardboard and Particle Board, sponsored jointly by the Food and Agriculture Organization of the United Nations and the Economic Commission for Europe, Geneva, Jan. 21 to Feb. 4, 1957, pub. by F.A.O. 1958, pp. 74, 264–109.

ALEXANDER BRODMERKEL, *Primary Examiner.*

EARL M. BERGERT, *Examiner.*

P. R. WYLIE, A. L. LEAVITT, F. S. WHISENHUNT,
*Assistant Examiners.*